G. A. BADER.
LENS MOUNTING.
APPLICATION FILED JULY 27, 1916.

1,307,573.

Patented June 24, 1919.

INVENTOR:
Gustav A. Bader
by Davis & Timms
his attorneys

100
UNITED STATES PATENT OFFICE.

GUSTAV A. BADER, OF ROCHESTER, NEW YORK.

LENS-MOUNTING.

1,307,573.  Specification of Letters Patent.  Patented June 24, 1919.

Application filed July 27, 1916. Serial No. 111,661.

*To all whom it may concern:*

Be it known that I, GUSTAV A. BADER, a citizen of the United States, and resident of Rochester, in the county of Monroe and State of New York, have invented certain new and useful Improvements in Lens-Mountings, of which the following is a specification.

The present invention relates to lens mountings of the type which connects a temple or other part to a lens or its frame, an object of this invention being to provide an improved connection between a lens mounting and a lens ring or frame, whereby the lens mounting does not project beyond the frame. Another object of the invention is to provide an improved construction which may be inexpensively formed from one piece of sheet metal to provide a pair of ears by which the mounting is secured in place, and a pair of ears to which the temple or other part is connected.

To these and other ends the invention consists of certain parts and combinations of parts all of which will be hereinafter described, the novel features being pointed out in the appended claims.

In the drawings:—

Figure 1:
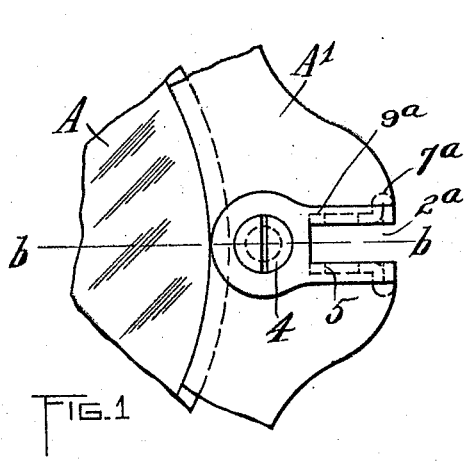
Figure 1 is a fragmentary view of a lens and its frame showing the improved lens mounting connected thereto.
Figure 4:
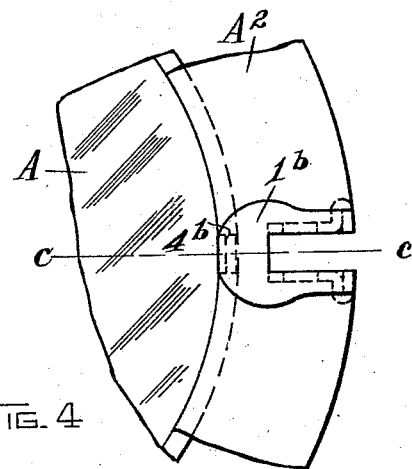
Fig. 4 is a view similar to Fig. 1 of another embodiment in which the lens mounting is held by a pair of integral prongs instead of a separate fastening screw.
Figure 2:
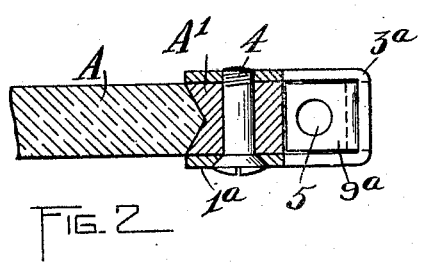
Fig. 2 is a section on the line $b$—$b$, Fig. 1.
Figure 5:
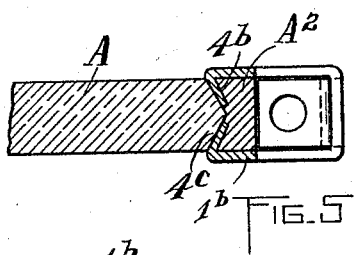
Fig. 5 is a section on the line $c$—$c$, Fig. 4.
Figure 3:
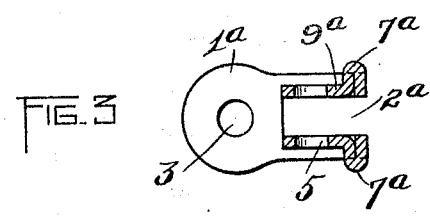
Fig. 3 is a vertical section through the lens mounting detached from the lens frame.
Figure 6:
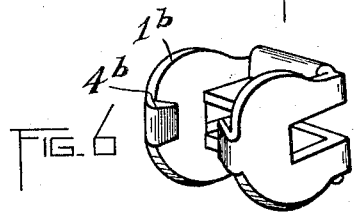
Fig. 6 is a perspective view of the lens mounting shown in Figs. 4 and 5.
Figure 7:
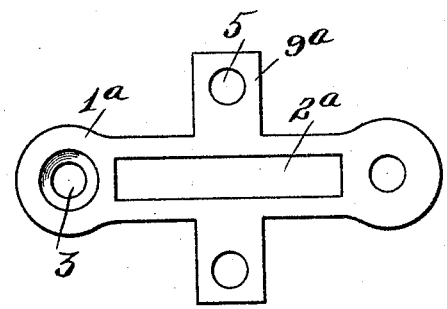
Fig. 7 is a view of the blank used in the embodiment shown in Figs. 1 to 3.
Figure 8:
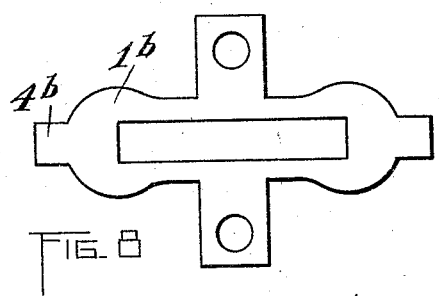
Fig. 8 is a view of the blank used in the embodiment shown in Figs. 4, 5 and 6.

Referring more particularly to the drawings, A indicates the lens surrounded by a lens frame indicated at A' in Fig. 1 and A² in Fig. 4, the lens frame of Fig. 4 being of uniform width about the lens, while the lens frame of Fig. 1 is provided with an enlargement adjacent the lens mounting. In both embodiments, the lens frame is provided with a recess in which the lens mounting is received.

In the embodiment shown in Figs. 1 to 3 and 7, the blank of the lens mounting is in the form of a cross, the arms $1^a$ being longer than the arms which form the temple securing ears $9^a$, and the separate portion of the blank, together with the arms $1^a$ being formed with a slot or opening $2^a$ extending into at least one of the arms, so that when the blank is bent at the juncture of the arms $1^a$, and the central portion as at $3^a$, a pocket is provided opening at the rear of the lens and also at one side. The arms which form the temple attaching ears are bent inwardly upon themselves as at $7^a$, and then at right angles to the central portion to fill the space between the two lens attaching ears $1^a$ at the side of the pocketed portion, said temple attaching ears lying within a recess of the lens ring or frame A', and the two lens attaching ears extending inwardly over the front and the rear faces of the lens frame A' from the recess in the said lens frame A'. The lens attaching ears are provided with lens openings 3 for receiving the lens screw 4 which, in this instance, passes through the lens frame A' of the lens. The temple attaching ears $9^a$ may have the openings 5 for receiving the pivot pin of the temple.

In the embodiment shown in Figs. 4, 5, 6 and 8, the parts of the mounting are the same as those shown in Figs. 1, 2, 3 and 7 except that the lens attaching ears $1^b$ are shorter than the ears $1^a$ of Fig. 1, and are not provided with screw openings, but instead have integral lugs or projections $4^b$ extending inwardly into converged relation from the opposite arms or ears $1^b$, so as to be received within recesses $4^c$ formed in the frame A².

In both embodiments of the invention, the lens mounting is arranged entirely within the lines of the lens ring or frame, due to the fact that the latter has a recess in which a portion of said lens mounting is received, the attaching ears of the mounting extending inwardly from said recess over opposite sides of the lens frame. The lens mounting is made from a single piece of flat stock with a central portion and a pair of lens attaching ears with their flat faces parallel, and also with a pair of temple attaching ears with their flat faces parallel, and at right angles to the flat faces of the lens attaching ears, said temple attaching ears extending in the same direction as the lens attaching ears and at least one of the latter having an opening through which the temple may extend to connect with the temple attaching ears.

What I claim as my invention and desire to secure by Letters Patent is:—

1. In combination with a lens frame formed with a recess, a lens mounting fitting in said recess and having attaching ears extending inwardly therefrom over opposite sides of the lens frame and also having temple attaching ears lying in the recess.

2. In combination with a lens frame formed with a recess, a lens mounting fitting in said recess and having attaching ears extending inwardly therefrom over opposite sides of the frame, said ears being provided with openings, and a fastener passing through said openings and the lens frame.

3. A lens mounting formed from a single piece of flat stock and having a central portion, lens attaching ears extending from two opposite sides of the central portion, at least one of said ears being provided with an opening, and temple attaching ears extending from two other opposite sides of the central portion, said temple attaching ears extending laterally in the same direction as the lens attaching ears and having their opposed faces flush with the upper and lower walls of the opening in the lens attaching ear so as to act as guides for the temple.

4. A blank for forming a lens mounting comprising a piece of flat stock having a central portion, lens attaching ears extending from two opposite sides of the central portion, and temple attaching ears extending from two other sides of the central portion, a slot being provided in the blank and extending through the central portion and at least into one of the lens attaching ears.

5. A lens mounting formed from a blank of flat stock comprising a central portion, two lens attaching ears bent in parallel relation from opposite sides of the attaching portion, a blank having an opening extending through the central portion and into at least one of the lens attaching ears, and temple attaching ears bent from opposite edges of the central portion to lie in parallel relation to the lens attaching ears and on opposite sides of the openings.

GUSTAV A. BADER.

Copies of this patent may be obtained for five cents each, by addressing the "Commissioner of Patents, Washington, D. C."